(12) United States Patent
Owaki et al.

(10) Patent No.: US 11,508,183 B2
(45) Date of Patent: Nov. 22, 2022

(54) BIOMETRIC INFORMATION AUTHENTICATION DEVICE

(71) Applicant: KABUSHIKI KAISHA TOKAI RIKA DENKI SEISAKUSHO, Aichi (JP)

(72) Inventors: Rijin Owaki, Aichi (JP); Yosuke Ohashi, Aichi (JP); Fumitaka Yoshikawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 246 days.

(21) Appl. No.: 16/771,622

(22) PCT Filed: Nov. 28, 2018

(86) PCT No.: PCT/JP2018/043809
§ 371 (c)(1),
(2) Date: Jun. 10, 2020

(87) PCT Pub. No.: WO2019/116895
PCT Pub. Date: Jun. 20, 2019

(65) Prior Publication Data
US 2020/0353895 A1 Nov. 12, 2020

(30) Foreign Application Priority Data
Dec. 12, 2017 (JP) .............................. JP2017-237511

(51) Int. Cl.
*G06V 40/12* (2022.01)
*B60R 25/04* (2013.01)
*B60R 25/25* (2013.01)
*B60R 25/31* (2013.01)
*G06F 21/32* (2013.01)
*G07C 9/37* (2020.01)

(52) U.S. Cl.
CPC .......... *G06V 40/1365* (2022.01); *B60R 25/04* (2013.01); *B60R 25/252* (2013.01); *B60R 25/31* (2013.01); *G06F 21/32* (2013.01); *G07C 9/37* (2020.01)

(58) Field of Classification Search
CPC .... G06V 40/1365; G06V 20/59; G06V 40/13; B60R 25/04; B60R 25/252; B60R 25/31; G06F 21/32; G07C 9/37; G07C 5/008
See application file for complete search history.

(56) References Cited

FOREIGN PATENT DOCUMENTS

| JP | 2006-155455 A | | 6/2006 | |
|----|---------------|---|--------|------------|
| JP | 2008-191743 | * | 8/2008 | ............... G06T 7/00 |
| JP | 2008-191743 A | | 8/2008 | |
| JP | 2011-008529 | * | 6/2009 | ............... G06T 7/00 |
| JP | 2011-008529 A | | 1/2011 | |
| JP | 2017-071317 | * | 10/2015 | ............. B60R 16/02 |
| JP | 2017-071317 A | | 4/2017 | |

* cited by examiner

*Primary Examiner* — Jonathan A Boyd
(74) *Attorney, Agent, or Firm* — Thomas W. Cole; Calderon Safran & Cole P.C.

(57) ABSTRACT

A biometric information authentication device includes an authentication unit to change an authentication threshold value used for authentication to increase difficulty of authentication when authentication of biometric information by checking against registered biometric information is unsuccessful a predetermined number of times.

8 Claims, 4 Drawing Sheets

BIOMETRIC INFORMATION AUTHENTICATION DEVICE

CROSS-REFERENCE TO RELATED APPLICATIONS

The present application is a U.S. National Phase of PCT/JP2018/043809 filed on Nov. 28, 2018 claiming priority to Japanese Patent Application No. 2017-237511 filed on Dec. 12, 2017. The disclosure of the PCT Application is hereby incorporated by reference into the present Application.

CROSS-REFERENCES TO RELATED APPLICATIONS

The present patent application claims the priority of Japanese patent application No. 2017/237511 filed on Dec. 12, 2017, and the entire contents of Japanese patent application No. 2017/237511 are hereby incorporated by reference.

TECHNICAL FIELD

The present invention relates to a biometric information authentication device.

BACKGROUND ART

An input device is known, in which a fingerprint recognition sensor reading fingerprint data, performing verification by comparison between the read fingerprint data and a pre-enrolled fingerprint data and identifying an individual based on the verification result is mounted on at least one of plural push switches and a control unit performs verification when detecting a push signal which is generated and transmitted at the time that the push switch mounting the fingerprint recognition sensor is pushed (see, e.g., Patent Literature 1).

With this input device, appropriate fingerprint data can be easily read by the fingerprint recognition sensor and verification of fingerprint can be appropriately performed.

CITATION LIST

Patent Literature

Patent Literature 1: JP 2006/155455 A

SUMMARY OF INVENTION

Technical Problem

False acceptance rate and false rejection rate are in a trade-off relation. Therefore, the input device disclosed in Patent Literature 1 has a problem that when the false acceptance rate is increased to improve usability, the probability of authenticating (resulting in a match with) a non-enrolled individual is increased and this compromises the security.

It is an object of the invention to provide a biometric information authentication device which can provide improved usability while ensuring the security level.

Solution to Problem

According to an embodiment of the invention, a biometric information authentication device comprises an authentication unit to change an authentication threshold value used for authentication to increase difficulty of authentication when authentication of biometric information by checking against registered biometric information is unsuccessful a predetermined number of times and a degree of similarity between the biometric information and the registered biometric information is not more than a reference threshold value.

According to an embodiment of the invention, it is possible to provide a biometric information authentication device which can provide improved usability while ensuring the security level.

DESCRIPTION OF EMBODIMENTS

Summary of the Embodiment

A biometric information authentication device in an embodiment is generally configured to include an authentication unit that changes an authentication threshold value used for authentication to increase difficulty of authentication when authentication of biometric information by checking against registered biometric information is unsuccessful a predetermined number of times and a degree of similarity between the biometric information and the registered biometric information is not more than a reference threshold value.

Even when the false acceptance rate is high to improve usability, this biometric information authentication device can reduce the probability of non-registered individuals being authenticated by increasing difficulty of authentication when authentication is unsuccessful plural times. Therefore, unlike when the authentication threshold is fixed, it is possible to improve usability while ensuring the security level.

Embodiment (General Configuration of Biometric Information Authentication Device 1)

Figure 1A:
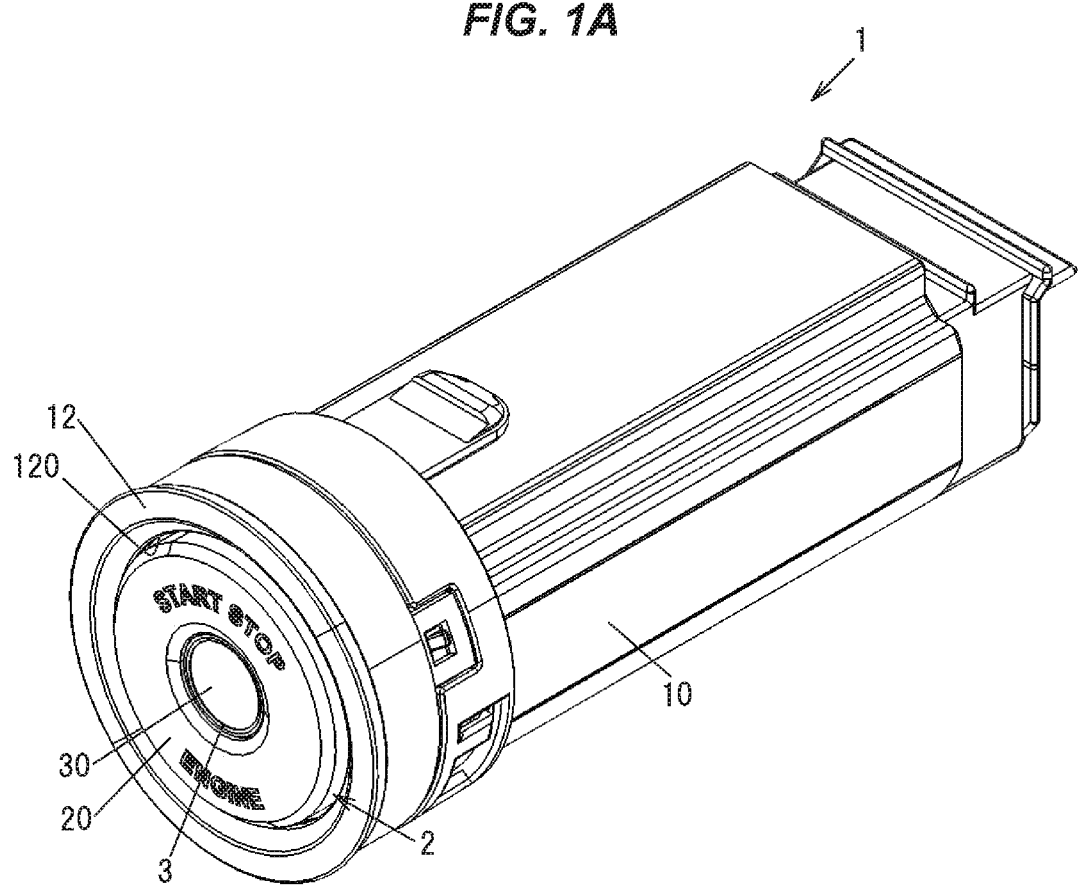
FIG. 1A is a perspective view showing a biometric information authentication device in an embodiment which has an opening with a perfect circle shape.
Figure 1B:
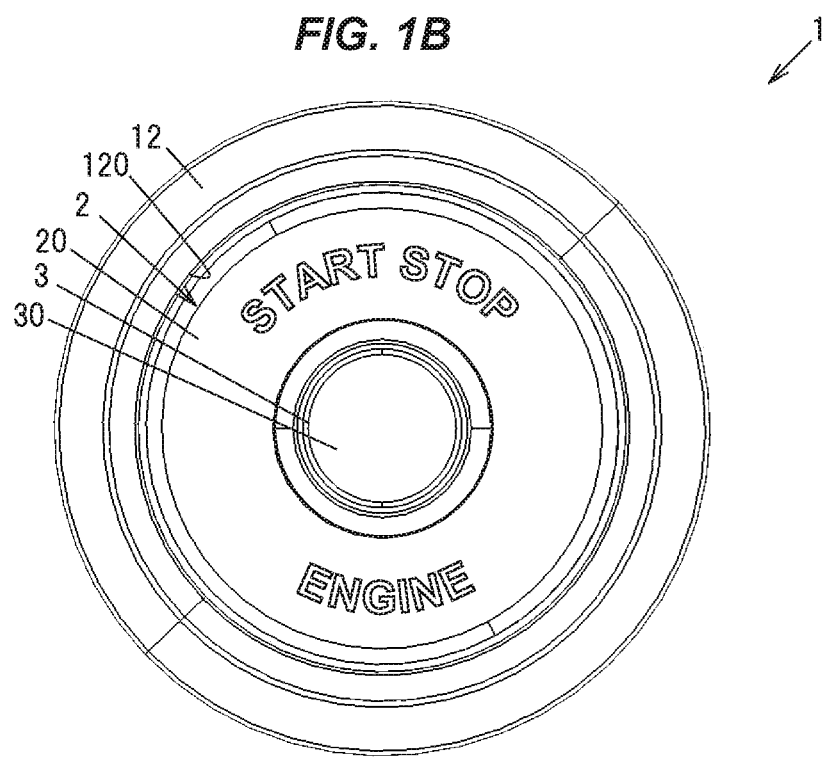
FIG. 1B is a front view showing the biometric information authentication device in the embodiment which has an opening with a perfect circle shape.
Figure 2A:
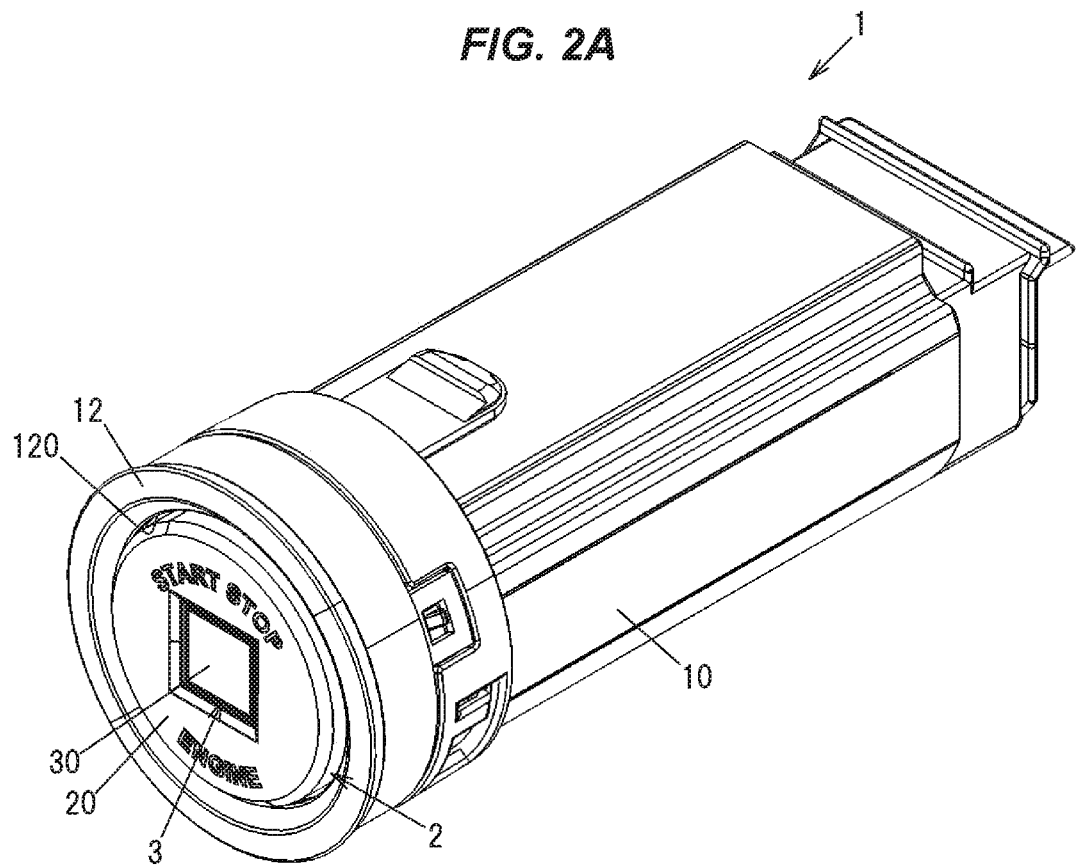
FIG. 2A is a perspective view showing the biometric information authentication device in the embodiment which has an opening with a rectangular shape.
Figure 2B:
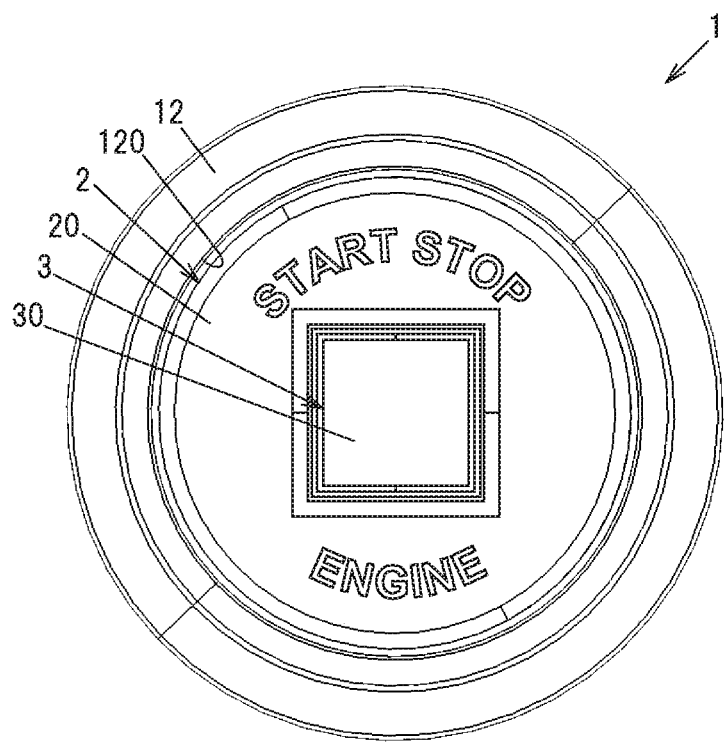
FIG. 2 is a front view showing the biometric information authentication device in the embodiment which has an opening with a rectangular shape.
Figure 3A:
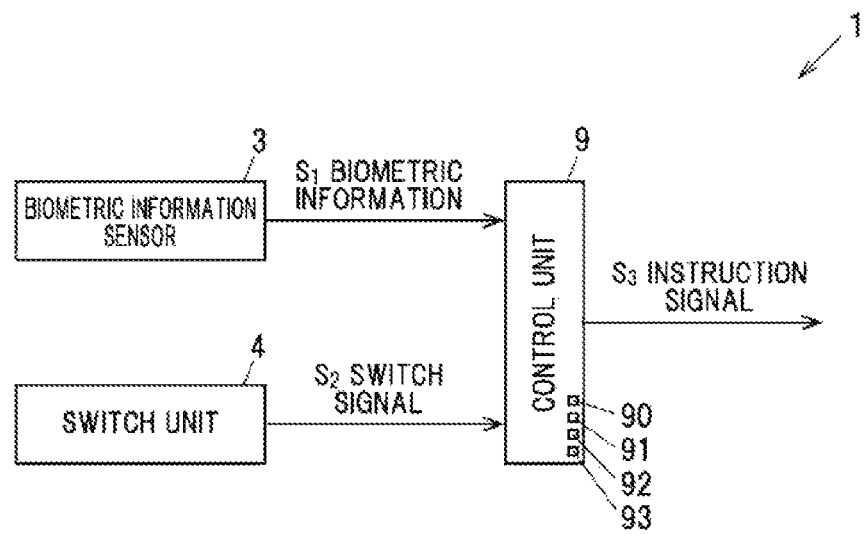
FIG. 3A is a block diagram illustrating the biometric information authentication device in the embodiment.
Figure 3B:
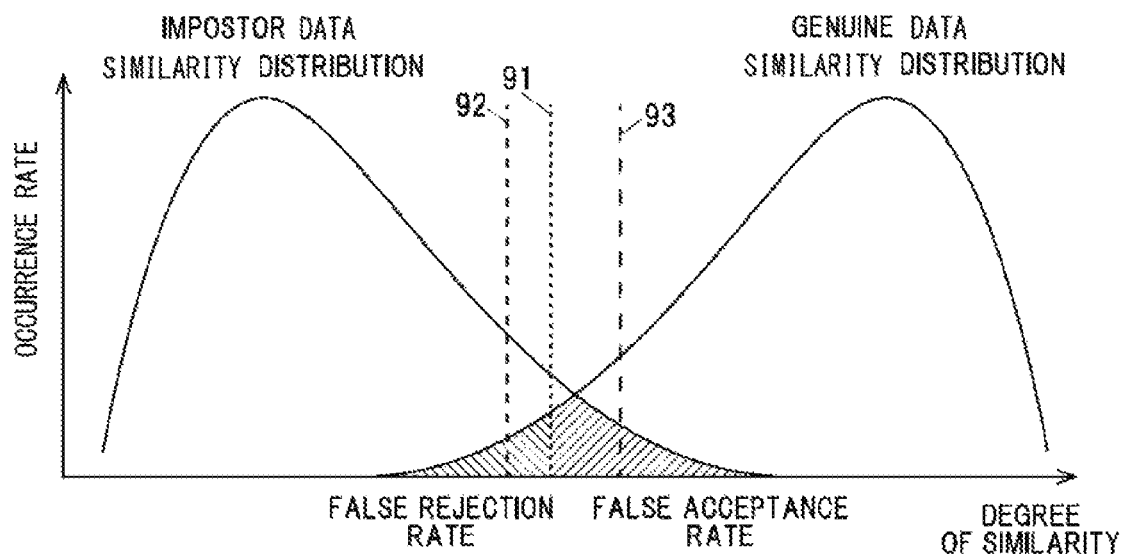
FIG. 3B is a graph showing degree of similarity and probability.
Figure 4:
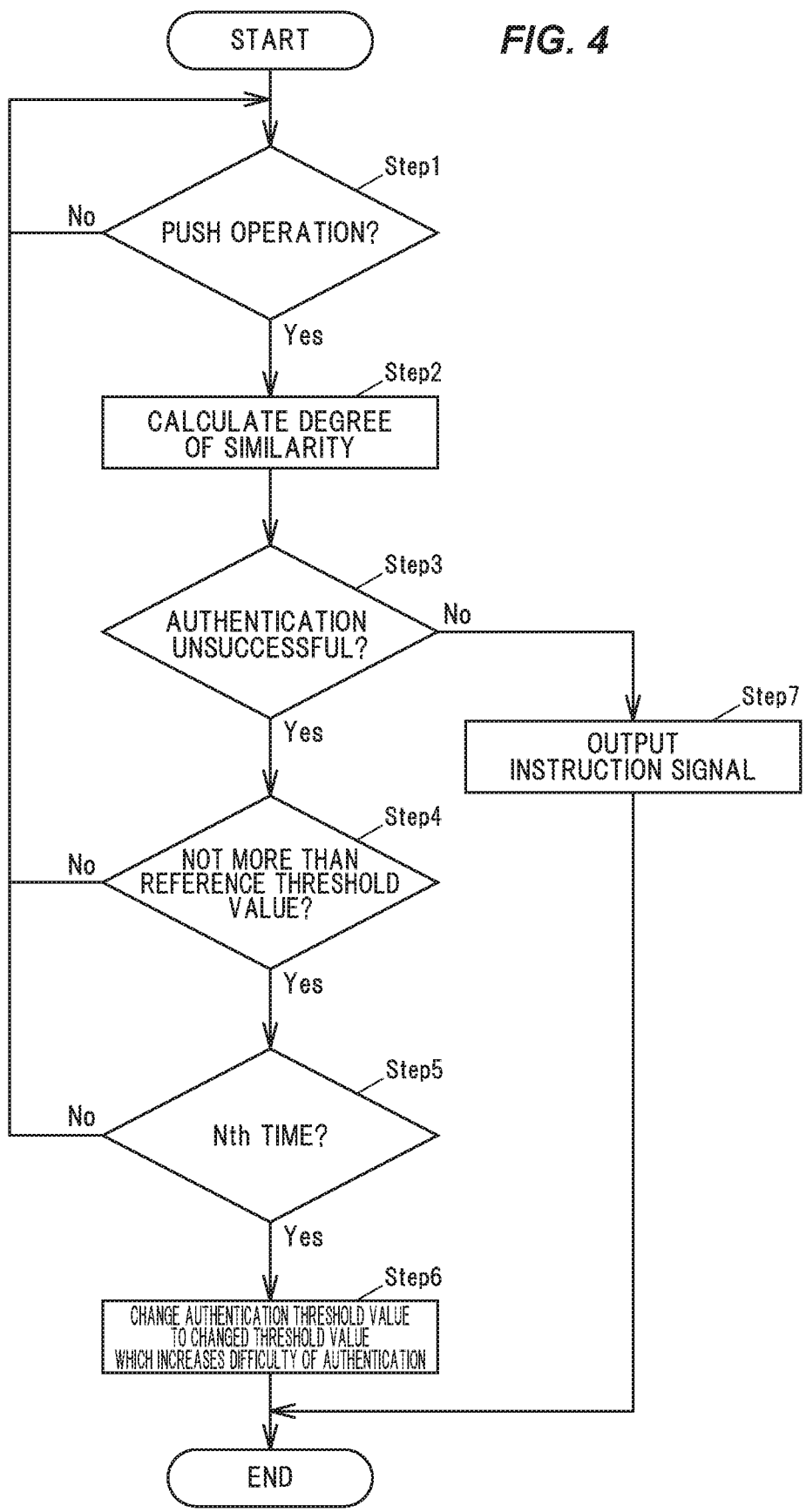
FIG. 4 is a flowchart showing an operation of the biometric information authentication device in the embodiment.

FIG. 1A is a perspective view showing a biometric information authentication device in an embodiment which has an opening with a perfect circle shape, and FIG. 1B is a front view showing the biometric information authentication device in the embodiment which has an opening with a perfect circle shape. FIG. 2A is a perspective view showing the biometric information authentication device in the embodiment which has an opening with a rectangular shape, and FIG. 2B is a front view showing the biometric information authentication device in the embodiment which has an opening with a rectangular shape. FIG. 3A is a block diagram illustrating the biometric information authentication device in the embodiment, and FIG. 3B is a graph showing degree of similarity and probability. In each drawing of the embodiment described below, a scale ratio may be different from an actual ratio. In addition, in FIG. 3A, flows of main signals and information are indicated by arrows.

The biometric information authentication device 1 is provided with, e.g., an operation button 2 having an operation surface 20 to be push-operated, a biometric information sensor 3 arranged on the operation button 2 so that a reading surface 30 for reading biometric information $S_1$ is exposed on the operation surface 20, a switch unit 4 which detects a push operation performed on the operation button 2, and a control unit 9 as the authentication unit, as shown in FIGS. 1A, 1B. 2A. 2B, 3A and 3B.

The biometric information authentication device 1 is configured as a start switch device for giving an instruction to turn on/off a drive system of the vehicle, as shown in FIGS. 1A, 1B, 2A and 2B, but it is not limited thereto.

The control unit 9 is generally configured to change an authentication threshold value 91 used for authentication to increase difficulty of authentication when authentication of biometric information $S_1$ by checking against registered biometric information 90 is unsuccessful a predetermined number of times and a degree of similarity between the biometric information $S_1$ and the registered biometric information 90 is not more than a reference threshold value 92.

The control unit 9 is also configured to change from the authentication threshold value 91, which has been changed, back to the previous value after a predetermined time has elapsed. In other words, the control unit 9 is configured to change from a changed threshold value 93 back to the authentication threshold value 91 after a predetermined time has elapsed.

Furthermore, the control unit 9 is also configured to change from the authentication threshold value 91, which has been changed, back to the previous value when authentication is successfully completed after the authentication threshold value is changed to increase difficulty of authentication. In other words, the control unit 9 is configured to change the changed threshold value 93 back to the authentication threshold value 91 when authentication is successfully completed after the authentication threshold value 91 is changed to the changed threshold value 93.

Furthermore, when the switch unit 4 is in the on state and authentication of the biometric information $S_1$ is successful, the control unit 9 outputs an instruction signal $S_3$ to give an instruction to start a drive system of a vehicle.

In detail, as an example, the biometric information authentication device 1 is configured that the biometric information sensor 3 can read the biometric information $S_1$ after doors are unlocked upon authentication based on wireless communication with an electronic key, etc., and drive voltage is supplied from a battery of the vehicle.

In the vehicle, the drive system is started based on the instruction signal $S_3$ indicating that the switch unit 4 is turned on by a push operation and authentication of the biometric information $S_1$ is successful. When giving an instruction to stop the drive system, the biometric information authentication device 1 is triggered by an input of a switch signal $S_2$ and outputs the instruction signal $S_3$ for stopping the drive system, without performing authentication of the biometric information $S_1$.

The drive system is, e.g., an internal combustion engine, a motor, or a combination thereof, etc. The biometric information authentication device 1 is configured to give an instruction to start/stop the drive system.

(Configuration of the Operation Button 2)

The operation button 2 is arranged, e.g., inside a cylindrical body 10 as shown in FIGS. 1A, 1B, 2A and 2B. A bezel 12 is attached to an end of the body 10 and the operation surface 20 of the operation button 2 is exposed in an opening 120 of the bezel 12. The switch unit 4 is arranged on an end portion of the operation button 2 on the opposite side to the operation surface 20.

(Configuration of the Biometric Information Sensor 3)

The biometric information sensor 3 is a sensor for acquiring the biometric information $S_1$. The biometric information $S_1$ acquired by the biometric information sensor 3 is information for identifying a user and is, e.g., a fingerprint pattern or a vein pattern.

The biometric information sensor 3 can be, e.g., an image sensor, or an optical sensor, which has a light-emitting portion and a light-receiving portion and acquires an amount of received light corresponding to a body part as the biometric information $S_1$, a capacitance sensor which acquires capacitance corresponding to the part as the biometric information $S_1$, an electric field intensity sensor which acquires electric field intensity corresponding to the part as the biometric information $S_1$, a pressure sensor which acquires magnitude of pressure corresponding to the part as the biometric information $S_1$, and a thermal sensor which acquires an amount of heat corresponding to the part as the biometric information $S_1$, etc.

The biometric information sensor 3 is arranged on the operation button 2 so that the reading surface 30 for sensing the biometric information $S_1$ is exposed. The reading surface 30 may be exposed through the opening 120 provided on the operation button 2. The shape of the opening 120 may be any shape and can be, e.g., a circle or a polygon. The circle may be, e.g., a perfect circle as shown in FIGS. 1A and 1B or may be an ellipse. The polygon may be a triangle, or may be a rectangle as shown in FIGS. 2A and 2B, or may be a polygon having not less than five corners. In addition, the reading surface 30 may be located at a lower level than the operation surface 20. Furthermore, the reading surface 30 is preferably located at the center of the operation surface 20 to reliably read the part (e.g., fingerprint) but may be located at other than the center of the operation surface 20.

When configured to read, e.g., a fingerprint pattern, the biometric information sensor 3 is constructed from a sensor of optical, capacitive, electric field strength measuring, pressure-sensitive, or thermal type.

Meanwhile, when configured to read, e.g., a vein pattern, the biometric information sensor 3 is configured to read a vein pattern based on reflection of infrared radiation.

As an example, the biometric information sensor 3 in the present embodiment is a capacitive sensor which reads a fingerprint pattern. The biometric information sensor 3 outputs the read fingerprint pattern, as the biometric information $S_1$, to the control unit 9.

(Configuration of the Switch Unit 4)

The switch unit 4 is a switch to be turned on by displacement of the operation button 2 due to a push operation, and is configured to be turned off when a load due to the push operation is removed.

When turned on, the switch unit 4 outputs the switch signal $S_2$ to the control unit 9. When the switch signal $S_2$ is input, the control unit 9 determines that a push operation is performed.

(Configuration of the Control Unit 9)

The control unit 9 is, e.g., a microcomputer composed of a CPU (Central Processing Unit) performing calculation and processing, etc., of the acquired data according to a stored program, and a RAM and a ROM (Read Only Memory) which are semiconductor memories, etc. The ROM stores, e.g., a program for operation of the control unit 9, the registered biometric information 90, the authentication threshold value 91, the reference threshold value 92 and the changed threshold value 93. The RAM is used as, e.g., a storage area for temporarily storing calculation results, etc.

As an example, the control unit 9 determines that an operator is the registered individual when the degree of similarity between the characteristic features of the fingerprint pattern of the operator based on the biometric information $S_1$ acquired from the biometric information sensor 3 and the characteristic features of the fingerprint pattern of the registered individual contained in the registered biometric information 90 as a template is not less than the authentication threshold value 91.

When, e.g., it is determined that the switch unit 4 is in the on state based on an input of the switch signals $S_2$ and it is also determined that the operator is the registered individual, the control unit 9 generates the instruction signal $S_3$ to give an instruction to start the drive system and outputs the instruction signal $S_3$ to a vehicle control unit, etc.

Now referring to FIG. 3B, the distribution on the left represents impostor distribution and the distribution on the right represents genuine distribution. In FIG. 3B, the horizontal axis indicates the degree of similarity and the vertical axis indicates the probability. In the region in which the two distributions overlap, the area on the left side of the authentication threshold value 91 (the area shaded with diagonal lines sloping down to the right) is the False Rejection Rate (FRR) and the area on the right side (the area shaded with diagonal lines sloping up to the right) is the False Acceptance Rate (FAR). Such impostor distribution and genuine distribution are produced since biometric information is different depending on, e.g., environmental conditions such as humidity and temperature.

When the authentication threshold value 91 is changed to a value on the right side on the paper of FIG. 3B, the security level is improved since difficulty of authentication is increased, but the usability decreases. The decrease in usability means that there is more likelihood that the biometric information $S_1$ will need to be read several times even in case of the registered individual since successful authentication does not occur without a high degree of similarity, and this decreases convenience.

Meanwhile, when the authentication threshold value 91 is changed to a value on the left side on the paper of FIG. 3, usability is improved due to easier authentication, but the security level decreases since the probability of non-registered individuals being authenticated is also increased. As such, the security level and the usability are in a trade-off relation. Setting of the authentication threshold value 91 in the present embodiment is such that, e.g., the false rejection rate is reduced so that usability is improved.

Meanwhile, the probability of erroneously determining a non-registered individual as the registered individual cannot be reduced to zero. In other words, the probability that a non-registered individual is authenticated after a number of attempts is not zero.

Thus, when authentication is unsuccessful a predetermined number of times (e.g., N times: N is a positive integer) and the degree of similarity is not more than the reference threshold value 92, the control unit 9 changes the authentication threshold value 91 to the changed threshold value 93 so that the false acceptance rate is further reduced. The control unit 9 is also configured to count the number of unsuccessful attempts.

The changed threshold value 93 is preferably set within, e.g., the false acceptance rate range which is indicated by diagonal lines sloping up to the right in FIG. 3B. It is because when out of this range, the probability of the registered individual being successfully authenticated is reduced and usability is thus not good.

The control unit 9 can further reduce the probability of erroneously determining a non-registered individual as the registered individual by changing the authentication threshold value 91 to the changed threshold value 93. The predetermined number of times here is about ten times, as an example.

Meanwhile, when the changed threshold value 93 is left as the threshold value used for authentication, the difficulty of authenticating the registered individual is also increased and usability is thus not good. Therefore, after a predetermined time has elapsed, the control unit 9 changes from the changed threshold value 93 back to the authentication threshold value 91. The predetermined time here is half day or one day, as an example. The control unit 9 is configured to change from the changed threshold value 93 back to the authentication threshold value 91 also when authentication using the changed threshold value 93 is successful.

As a modification, the control unit 9 may be configured to stop authentication when authentication is unsuccessful plural times. As an example, when the threshold value is changed from the authentication threshold value 91 to the changed threshold value 93 and authentication is unsuccessful a further predetermined number of times, the control unit 9 does not perform further authentication. The predetermined number of times here is about ten times, as an example.

As another modification, the control unit 9 may be configured to stepwise increase the authentication threshold value 91 when authentication is unsuccessful a predetermined number of times and also the degree of similarity is not more than the reference threshold value 92. In this case, for example, the control unit 9 increases the authentication threshold value 91 after the above-mentioned conditions are satisfied, and the control unit 9 further increases the authentication threshold value 91 when subsequent authentication is unsuccessful and also the degree of similarity is not more than the reference threshold value 92. The control unit 9 has the changed threshold value 93 as, e.g., the upper limit threshold and stepwise increases the authentication threshold value 91 up to the changed threshold value 93.

Next, an example of an operation of the biometric information authentication device 1 in the present embodiment to start the drive system will be described in reference to the flowchart of FIG. 3.

(Operation)

The control unit 9 of the biometric information authentication device 1 determines that a push operation is performed when it is "Yes" in Step 1, i.e., when the switch signals $S_2$ is input from the switch unit 4 (Step 1: Yes).

Then, based on the biometric information $S_1$ read at the time of the push operation and the registered biometric information 90, the control unit 9 calculates the degree of similarity (Step 2). After that, the control unit 9 determines whether or not the calculated degree of similarity is not less than the authentication threshold value 91.

When the degree of similarity is smaller than the authentication threshold value 91 and authentication is unsuccessful (Step 3: Yes) and also when the degree of similarity is not more than the reference threshold value 92 (Step 4: Yes), the control unit 9 checks the number of successive unsuccessful attempts.

When the $N^{th}$ attempt, which is the predetermined number of times, is unsuccessful (Step 5: Yes), the control unit 9 changes the authentication threshold value 91 to the changed threshold value 93 to increase the difficulty of authentication (Step 6). Then, the control unit 9 uses the changed threshold value 93 from the next authentication.

Meanwhile, when authentication is successful in Step 3 (Step 3: No), the control unit 9 outputs the instruction signal $S_3$ to give an instruction to start the drive system (Step 7).

Then, when the degree of similarity is larger than the reference threshold value 92 in Step 4 (Step 4: No), the control unit 9 resets the count of the number of unsuccessful attempts and proceeds the process to Step 1.

Furthermore, when unsuccessful attempts are less than N times in Step 5 (Step 5: No), the control unit 9 adds one count and proceeds the process to Step 1.

Effects of the Embodiment

The biometric information authentication device 1 in the present embodiment can provide improved usability while ensuring the security. In detail, when the degree of similarity is not more than the reference threshold value and also authentication is unsuccessful a predetermined number of times, the biometric information authentication device 1 increases difficulty of authentication and thus can further reduce the probability of non-registered individuals being authenticated. Therefore, unlike when the authentication threshold value is fixed, the biometric information authentication device 1 can improve usability and also ensure the security by increasing the authentication threshold value 91.

In the biometric information authentication device 1, the reference threshold value 92 is set as a condition to increase difficulty of the authentication threshold value 91. Authentication is sometimes not successful even in case of the registered individual since the characteristic features of the biometric information varies due to environmental conditions such as humidity and temperature as described above or a cut on the operating finger, etc. If the reference threshold value 92 is not set, the authentication threshold value 91 may be changed even when the registered individual is trying, causing a decrease in usability. However, since the biometric information authentication device 1 in the present embodiment increases the difficulty of authentication when the degree of similarity is not more than the reference threshold value 92 for not less than N times, it is possible to reduce the probability of increase in difficulty of authenticating the registered individual.

The biometric information authentication device 1 changes from the changed threshold value 93 back to the authentication threshold value 91 after a predetermined time has elapsed. Therefore, unlike when such a configuration is not adopted, it is possible to suppress a decrease in usability of the registered individual.

The biometric information authentication device 1 changes back to the authentication threshold value 91 when authentication using the changed threshold value 93 is successful. Therefore, unlike when such a configuration is not adopted, it is possible to suppress a decrease in usability of the registered individual.

The biometric information authentication device 1 changes the authentication threshold value 91 to the changed threshold value 93 to increase difficulty of authentication when the degree of similarity is not more than the reference threshold value 92 and also authentication is unsuccessful a predetermined number of times. Therefore, unlike when such a configuration is not adopted, it is possible to further reduce the probability that an intentional attempt by non-registered individuals is successful.

Since the biometric information authentication device 1 is configured as a start switch device, security is further enhanced as compared to when an instruction to start the drive system of the vehicle can be given by carrying an electronic key, etc., of a vehicle.

Although some embodiment and modifications of the invention have been described, the embodiment and modifications are merely examples and the invention according to claims is not to be limited thereto. These new embodiment and modifications may be implemented in various other forms, and various omissions, substitutions and changes, etc. can be made without departing from the gist of the invention. In addition, all combinations of the features described in the embodiment and modifications are not necessary to solve the problem of the invention. Further, these embodiment and modifications are included within the scope and gist of the invention and also within the invention described in the claims and the range of equivalency.

REFERENCE SIGNS LIST

1 BIOMETRIC INFORMATION AUTHENTICATION DEVICE
2 OPERATION BUTTON
3 BIOMETRIC INFORMATION SENSOR
4 SWITCH UNIT
9 CONTROL UNIT
20 OPERATION SURFACE
30 READING SURFACE
90 REGISTERED BIOMETRIC INFORMATION
91 AUTHENTICATION THRESHOLD VALUE
92 REFERENCE THRESHOLD VALUE
93 CHANGED THRESHOLD VALUE

The invention claimed is:

1. A biometric information authentication device that provides instructions to start a drive system of a vehicle, comprising a biometric information sensor configured to read biometric information, and an authentication unit that is configured to compare biometric information read by the biometric information sensor against registered biometric information and to provide a start signal when a similarity between the read biometric information and the registered biometric information is equal to or exceeds an authentication threshold value, and configured to change the authentication threshold value used for authentication to increase the difficulty of authentication when authentication of biometric information by comparing against registered biometric information is unsuccessful a predetermined number of times wherein the authentication unit increases the authentication threshold value in a stepwise increasing manner based on a combination of the number of unsuccessful authentications and whether the degree of similarity between the read biometric information and the registered biometric information is not more than a reference threshold value that is less than the authentication threshold value, and wherein the authentication unit does not increase the authentication threshold value based on a combination of the number of unsuccessful authentications if the degree of similarity between the read biometric information and the registered biometric information is more than a reference threshold value.

2. The biometric information authentication device according to claim 1, wherein the authentication unit changes the authentication threshold value to a value that is set within a range of false acceptance rate defined by the previous value.

3. The biometric information authentication device according to claim 1, wherein the authentication unit changes from the changed authentication threshold value back to the previous value after a predetermined time has elapsed.

4. The biometric information authentication device according to claim 1, wherein the authentication unit changes from the changed authentication threshold value back to the previous value when authentication is successfully completed after the authentication threshold value is changed to increase difficulty of authentication.

5. The biometric information authentication device according to claim 1, wherein the authentication unit does not perform further authentication when authentication is unsuccessful a further predetermined number of times after changing the authentication threshold value to increase difficulty of authentication.

6. The biometric information authentication device according to claim 1, further comprising: an operation button comprising an operation surface to be push-operated; a biometric information sensor arranged on the operation button so that a reading surface for reading the biometric information is exposed on the operation surface; and a switch unit that detects a push operation performed on the operation button.

7. The biometric information authentication device according to claim 6, wherein, when the switch unit is turned on and authentication of the biometric information is successful, the authentication unit outputs an instruction signal for giving an instruction to start a drive system of a vehicle.

8. The biometric information authentication device according to claim 6, wherein the biometric information sensor is arranged at the center of the operation surface of the operation button.

* * * * *